3,395,226
CONTROL OF FUNGI AND NEMATODES WITH ETHYLENE SULFITE AND PROPYLENE SULFITE
George H. Latham, deceased, late of New Castle County, Del., by Wilmington Trust Company, executor, Wilmington, Del., assignor to E. I. du Pont de Nemours and Company
No Drawing. Filed Nov. 5, 1964, Ser. No. 409,336
11 Claims. (Cl. 424—276)

This invention relates to the use of chemicals to protect plants from soil pests.

More specifically, it refers to a method for protecting plants from soil pests such as plant parasitic nematodes and pathogenic soil fungi by applying to the soil a plant protectant amount of ethylene or propylene sulfite.

According to the 1953 Yearbook of the U.S. Dept. of Agriculture the average annual loss in the U.S. from plant diseases was estimated to be about three billion dollars. A projected world-wide figure based on that amount would exceed ten billion dollars. Much of this loss is due directly to the action of such soil pests as nematodes and soil fungi.

Of the many organisms which cause plant diseases such as viruses, bacteria and fungi, few have a more widespread attack than the nematode. The root knot nematode, Meloidogyne spp., alone attacks more than 1800 plant species according to C. Wescott at p. 249 of the Plant Disease Handbook 2nd ed. (1960). Information gathered during the past one hundred years indicates that all of the crop and ornamental plants grown in the world, and probably most wild plants, can be attacked by plant parasitic nematodes.

Nematodes are found to concentrate in the top few inches of soil where they are present in fantastic numbers. An upper foot of low lying illuvial soil can contain more than three billion nematodes to the acre. More than 15 billion nematodes were reported in the top 28.3 inches of one acre of sugar beet soil in Utah by G. Steiner, Proc. First Int. Congr. Soil Sci., 1928, 3: 260–366. Such numbers, while so large as to stagger the imagination are truly indicative of the intensity of nematode infestation as indicated by the summary at p. 322 of Principles of Soil Microbiology by S. A. Waksman, 2nd ed. 1932.

Soil fungi are even more widespread and varied in their attack than are the nematodes. Soil fungi probably attack every form of plant life, both living aand dead, in the world.

Among the many soil fungi, few are more prevalent and have a broader spectrum of host plants than the genus Rhizoctonia spp. Rhizoctonia spp. attack hundreds of kinds of plants causing blights and rots in field crops, ornamentals, cereals, grasses and truck crops.

Rhizoctonia spp. are prevalent in varying degrees of severity throughout every state in the United States as well as in most of the rest of the world. They are capable of persisting in the soil for many years even though no cultivated crops are being grown.

Thus a practical and satisfactory method of protecting plants from the ravages of soil pests such aas nematodes and Rhizoctonia spp. is a continued goal of the agricultural industry. Such a method would find prompt and widespread use among truck crops, field crops, orchards, and nurseries, so long as it exhibited no adverse side effects on the plant itself.

It has been discovered that ethylene and propylene sulfite possess outstanding plant protectant activity against such soil pests while exhibiting no apparent phytotoxicity to crop plants, fruit trees and ornamentals when applied to the soil in normal commercial pesticidal dosages. Additionally, ethylene and propylene sulfite offer plant protection at low rates, and exhibit no apparent residual effects which would adversely affect the ecology of the surrounding area.

Ethylene and propylene sulfite are particularly effective in controlling nematodes such as Meloidogyne spp., Hoplolaimus spp., Xiphinema spp., Tylenchorhynchus, spp., Trichodorus spp., Heterodera spp., Ditylenchus, spp. Belonolaimus spp., Criconemoides spp., and Pratylenchus, spp., and fungi belong to the genus Rhizoctonia spp., and other fungi such as Herminthosporium spp., Pythium spp., and Fusarium spp., as is more fully illustrated hereinafter in the examples.

The ethylene and propylene sulfites used in this invention are liquids which are structurally defined as follows:

(1) 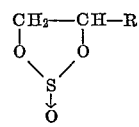

Where R=H, CH$_3$. They are prepared by such well known conventional methods as the catalyzed, gaseous reaction of ethylene oxide and sulfur dioxide or by the reaction of ethylene or propylene glycol with thionyl chloride.

COMPOSITIONS

Plant protectant compositions of this invention can comprise ethylene or propylene sulfite and one or more surface-active agents.

The surface-active agents or surfactants can include any of the anionic, cationic and non-ionic surface-active agents. Suitable surface-active agents are those set forth, for example, in "Detergents and Emulsifiers 1964 Annual" by John W. McCutcheon, Inc.

Among the more preferred surfactants are those anionic and non-ionic agents recognized in the art as wetting agents, dispersants or emulsifiers. Among the anionic surfactants, preferred ones are alkali metal or amine salts of alkylbenzene sulfonic acids such as dodecyl-benzene sulfonic acid, fatty alcohol sulfates such as sodium lauryl sulfate, alkylnaphthalene sulfonates, sodium-N-methyl-N-oleoyltaurate, fatty acid esters of sodium isethionate, dioctyl sodium sulfosuccinate, alkali and alkaline earth salts of lignin sulfonic acids and sodium dodecyldiphenyl-oxide disulfonate. Among the non-ionic compounds, the preferred members are alkylphenoxy poly(ethyleneoxy) ethanols such as nonylphenol adducts with ethylene oxide; trimethylnonylpolyethylene glycol ethers, polyethylene oxide adducts to fatty and rosin acids, long chain alkanol or mercaptan adducts with ethylene oxide, ethylene oxide adducts to esters of sorbitol with fatty acids, and ethylene oxide propylene oxide condensates.

Most preferred anionic surfactants because they improve the ease of dissemination of the ethylene or propylene sulfite, are salts of alkylnaphthalene or alkylbenzene sulfonic acid, and alkali or alkaline earth metal salts of lignin sulfonic acids.

Most preferred non-ionic surfactants, because they improve the ease of dissemination of the ethylene or propylene sulfite, are ethylene oxide adducts to alkylphenol, to long chain alkyl aclohols containing eight through fourteen carbon atoms, to long chain alkyl mercaptans containing eight through fourteen carbon atoms or to sorbitan fatty acid esters.

Surfactants can be present in compositions in this invention in the range of 0.1 to 20% by weight. However, a range of 0.2 to 10% by weight is preferred.

Liquid compositions may contain ethylene or propylene sulfite in common liquid solvents with or without surfactant present. Such solvents as alcohols, glycols, esters, ketones, chlorinated hydrocarbons, Cellosolves, aliphatic and aromatic hydrocarbons, dialkyl sulfoxides, and N,N-dialkyl amides are satisfactory.

Suitable liquid solvents include xylene, alkylated naphthalene, cyclohexane, cyclohexanone, chloroethanes, isophorone, dimethylformamide, dimethylacetamide, and dimethylsulfoxide.

Preferably solvents having low phytotoxicity should be used. Among these are white oils, particularly low viscosity oils, isoparaffins such as the "Soltrols" and other hydrocarbons having a low sulfonatable residue.

One group of preferred compositions may contain the ethylene or propylene sulfite dissolved in water-miscible solvents, with or without surfactant present. Such formulations may contain from 1 to 95% of the active ingredient, the rest being solvents and surfactants. Such compositions may be applied directly or after dilution with water.

Low strength compositions containing one or more of the above-mentioned solvents can be used for direct application to the soil.

Additionally, ethylene or propylene sulfite can be formulated into more concentrated emulsifiable solutions containing 10 to 95% by weight of ethylene or propylene sulfite, plus solvent and emulsifiers to make up 100%. The solvents can be water insoluble. Typical of the solvents used are higher ketones, higher aliphatic and aromatic hydrocarbons, chlorinated hydrocarbons and the like.

Additional compositions can be formulated by adding a free-flowing inert powder to the ethylene or propylene sulfite to form a dust.

Free-flowing inert powders can be any of the extenders commonly employed in the nematocide and fungicide art. They can include inert finely divided diluents such as natural clays including attapulgite, bentonite or kaolinite, diatomaceous earth, pyrophyllite, talc, synthetic mineral fillers derived from silica and silicates such as synthetic fine silica and synthetic calcium or magnesium silicate, carbonates, phosphates, sulfates, sulfur, lime, and such flours as wood-, walnut shell-, redwood-, soybean- and cottonseed-.

Dust compositions can contain 1 to 30% by weight of ethylene or propylene sulfite. However, 3 to 15% by weight is preferred.

Particle size of the extender can vary considerably, but will ordinarily be somewhat under 50 microns in the finished formulation. Ureas and other fertilizers can be added to dust formulations to bring the concentration of ethylene or propylene sulfite down to 0.5 to 5% by weight of the total formulation.

Granular compositions of the ethylene or propylene sulfites are also of importance. Such granules can have a particle size of 4 to 60 mesh. Granules employing these compounds can be prepared by spraying the ethylene or propylene sulfite either as is, or in a solution, over the surface of preformed clay granules, expanded vermiculite, perlite, or preformed granular organic carriers such as granular corn cobs. Alternatively, the ethylene or propylene sulfite can be mixed with finely divided clays and the mixture then granulated. Preferred granules will contain 0.1 to 10% by weight of an ethylene oxide adduct to alkylphenols. In these compositions, the ethylene or propylene sulfite ordinarily will be present at the rate of 1 to 40% by weight. However, 3 to 25% by weight is the preferred concentration of ethylene or propylene sulfite.

Similarly, pellets can be prepared by blending the ethylene or propylene sulfites with pelleting clays, water, and if desired, surfactants, and extruding the mass, cutting the extrusions into the desired size, followed by drying. Such pellets can contain from 10 to about 40% of the active ingredient.

In wettable powder compositions containing ethylene or propylene sulfite, one or more surfactants and an absorbent solid diluent, the ethylene or propylene sulfite ordinarily will be present in a concentration in the range of 10 to 40% by weight. It is preferred to have 15 to 25% by weight of ethylene or propylene sulfite. Surfactants will be present in a range from 0.1 to 10% by weight to obtain adequate wetting and dispersion in water. Preferred surfactants are salts of alkylbenzene or naphthalene sulfonic acids and salts of lignin sulfonic acids. The remainder of the composition contains a solid absorbent diluent as described above. Preferred diluents are diatomaceous earth, attapulgite or synthetic fine silica.

Wettable powders are prepared by mixing the ingredients in a blender and grinding the mixture in a hammer mill, air impact mill or the like until the particle size has been reduced to make spray application practical and easy. These wettable powders can also be blended with additional diluents, such as talcs, to form the above-mentioned dust mixtures for direct dry application.

Compositions of this invention can obtain soil insecticides such as chlordane, DDT, dieldrin, endrin, aldrin, methoxychlor, and others for simultaneous control of insects, nematodes, and fungi in the soil. From 0.1 to 10 parts by weight of the insecticide is used for each one part by weight of ethylene or propylene sulfite.

Compositions of this invention can also contain other fungicides for control of a broader spectrum of fungi. Illustrative of some of the other compounds which can be used are:

p-dimethylaminobenzenediazo sodium sulfonate;
quinone oxyaminobenzooxohydrazone;
tetraalkyl thiuramsulfides such as tetramethyl thiuram monosulfide or disulfide and tetraethyl thiuram monosulfide or disulfide;
metal salts of ethylene bisdithiocarbamic acid, e.g. manganese, zinc, iron and sodium salts;
pentachloronitrobenzene;
dodecylguanidine acetate;
N-trichloromethylthio tetrahydrophthalimide (captan);
phenylmercury acetate;
2,4-dichloro-6-(o-chloroanilino)-s-triazine;
N-methylmercury p-toluenesulfonanilide;
chlorophenol mercuri hydroxides;
nitrophenol mercuri hydroxides;
ethyl mercury acetate;
ethyl mercury 2,3-dihydroxypropyl mercaptide;
methyl mercury acetate;
methyl mercury 2,3-dihydroxypropyl mercaptide;
1,4-dichloro-2,5-dimethoxybenzene;
3,3'-ethylenebis(tetrahydro-4,6-dimethyl-2H-1,3,5-thiadiazine-2-thione);
methyl mercury dicyanodiamide;
N-ethyl mercury-p-toluenesulfonanilide;
metal (e.g. iron, sodium and zinc), ammonium and amine salts of dialkyldithiocarbamic acids;
tetrachloronitroanisole;
hexachlorobenzene;
methyl mercury nitrile;
tetrachloroquinone; and
N-trichloromethylthiophthalimide.

These additional fungicides when used, will be present in the range of one-tenth to ten parts by weight for each one part by weight of a compound of Formula 1.

Wettable powder formulations containing an insecticide, ethylene or propylene sulfite, and other fungicides if desired, are prepared by blending with a diluent and a surfactant, and then grinding in a hammer mill or air impact mill to obtain intimately blended finely divided particles. This type formulation can be dispersed in water, and sprayed in broadcast treatments followed by rotovation into the soil, or sprayed in the furrow.

Dust compositions containing an insecticide, ethylene or propylene sulfite, and other fungicides if desired, can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides and fungicides can also be combined with ethylene or propylene sulfite in emulsifiable compositions by dissolving the additives in ethylene or propylene sulfate, or by dissolving the additives and ethylene or propylene sulfite in an inert solvent containing an emulsifier. These compositions are emulsified in water and applied to the soil much like the wettable powders above.

In addition, compositions can contain special additives such as corrosion inhibitors, pigments, anti-foam agents and the like.

APPLICATION

Compositions of this invention can be sprayed, injected or mixed into the soil. Soil applications are applied at or before planting, as a side dressing to living plants, in the furrow, as a hopper-box treatment or as a soil drench. The dosage is from 20 pounds to 200 pounds of active ingredient per acre treated depending on method of application and soil type. A preferred rate of application because of economy and effectiveness is from 60 pounds to 90 pounds of active ingredient per acre.

Good results are obtained by an in-the-row treatment. Treatment is directed on a band approximately two to four inches wide over an open furrow in such a way as to strike the sides of the furrow as well as the bottom of the furrow. Seed can then be planted and the furrow closed. Thus the seeds, seedlings, and young growing plants are protected from attack by nematodes and soil fungi. Alternatively, compositions of this invention can be injected into the proximity of a closed furrow containing the seed. One to ten pounds of active ingredient per 12,000 feet of a two inch wide row gives satisfactory seed and plant protection.

A preferred dosage in the row because of exceptionally good control of soil pests at low cost is three to five pounds of active ingredient per 12,000 feet of a two inch wide row. Obviously, if the band width treated is more or less than two inches the dosage rate is adjusted accordingly. In-the-row treatment is extremely useful in protecting seeds, newly germinated seedlings, and young growing plants, ornamentals and the like from attack by nematodes and fungi.

Soil drench treatments protect seeds, seedlings, and plants from the ravages of soil pests by application of the compositions of this invention at rates of about 40 to 100 pounds of active ingredient per acre.

Compositions of this invention can also be used for seed treatments of such seeds as oats and the other small grains, cotton, corn, sorghum, beans, and peas. For example, the material can be applied as a solution, dust, or slurry to the surface of seeds in conventional seed treating devices or can be mixed with seeds such as cotton seeds in the hopper-box at planting time. Rates of 0.5 to 8 ounces of active ingredient per cwt. of seeds give protection from nematodes and soil fungi. A preferred rate because of excellent control and low cost is one to 4 ounces of active ingredient per cwt. of seeds.

In order that this invention can be better understood the following additional examples are provided. It should be understood that all percentages given are by weight unless otherwise specified.

Example 1

| | Percent |
|---|---|
| Ethylene sulfite | 95 |
| Polyalkylaryl carboxylic acid esters plus oil soluble sulfonates | 5 |

These two ingredients are blended in a tank until a solution results.

This emulsifiable concentrate is diluted with sufficient water to drench the soil to the root zone of the plants and applied to roses at a rate of about 40 pounds active agent per acre. Excellent control is obtained of the dagger nematode, *Xiphinema diversicaudatum*, allowing the roses to grow in a normal manner.

Propylene sulfite when substituted for ethylene sulfite in the above formulation exhibits similar activity.

Example 2

| | Percent |
|---|---|
| Propylene sulfite | 90 |
| Trimethylnonyl alcohol, adduct with ethylene oxide | 3 |
| Ethylene glycol | 7 |

The ingredients are blended in a tank until a homogeneous solution is obtained. This mixture is applied at the rate of 4 oz. per cwt. of cotton seed. The seed is planted in soil infested with a normal population of pathogenic fungi, including Rhizoctonia spp. An excellent stand of germinated seedlings is obtained.

Example 3

| | Percent |
|---|---|
| Ethylene sulfite | 25.0 |
| Dioctyl sodium sulfosuccinate | 0.5 |
| Calcium lignin sulfonate | 2.0 |
| Synthetic fine silica | 5.0 |
| Montmorillonoid clay | 67.5 |

The montmorillonoid is charged to a ribbon blender and the ethylene sulfite is sprayed over the clay while the blender is operating. The other ingredients are then charged to the blender and blending is continued until the mass is thoroughly mixed. The blend is then ground in a hammer mill until the particle size is substantially less than 50 microns in diameter.

This 25% wettable powder formulation is dispersed in water and applied with conventional spray equipment at a concentration of about 10 pounds wettable powder to 10 gallons of water at a rate of about 120 pounds active ingredient per acre to land infested with plant pathogenic nematodes. After spraying onto the surface of the soil, the chemical is mixed in the soil to a depth of 4 to 6 inches with a rotovator.

Soil infested with the root-knot nematode, meloidogyne spp. is treated in this way. Cotton plants grown in the treated soil show normal development free from nematode infection.

Upon repeating this procedure, replacing the ethylene sulfite with propylene sulfite, similar results are achieved.

Example 4

| | Percent |
|---|---|
| Ethylene sulfite | 50 |
| Alkyl aryl polyether alcohols | 5 |
| Heavy aromatic naphtha | 45 |

These ingredients are added to a mixing tank and agitated until solution is complete.

The above emulsifiable concentrate is diluted with water and sprayed at the rate of 80 pounds per acre of active ingredient in 120 gallons of water on a field infested with the sugar beet nematode *Heterodera schachtii* and the chemical is worked into the soil to a depth of 6 inches. Sugar beets grown in this field develop normally and are substantially free from infestation by nematodes. In an untreated area in the same field, beets are distorted and yields reduced.

Substitution of propylene sulfite for ethylene sulfite in the above formulation results in a concentrate which exhibits similar desirable activity.

Example 5

| | Percent |
|---|---|
| Propylene sulfite | 20 |
| Granular attapulgite clay, 15–30 mesh | 80 |

The granular attapulgite clay is charged to a blender. While the blender is operating the ethylene sulfite is sprayed over the tumbling mass. Blending is continued until the chemical is adsorbed.

The granular product is applied to soil infested with pathogenic nematodes at a rate of about 180 pounds active agent per acre using a conventional fertilizer spreader. The active agent is then worked into the soil by disking. This treatment gives substantially complete control of the sting nematode Belonolaimus spp.

Ethylene sulfite when substituted for the propylene sulfite in this formulation, exhibits similar activity.

Example 6

| | Percent |
|---|---|
| Ethylene sulfite | 60 |
| Blend of calcium dodecylbenzene sulfonate and nonyl phenol polyethylene oxide condensation products | 5 |
| Xylene | 35 |

These ingredients are added to a blending tank and are agitated until solution is complete. The resulting emulsifiable composition is extended with water and sprayed at the rate of 80 pounds per acre of active ingredients in 120 gallons of water on a field infested with the sugar beet nematode *Heterodera schachtii*, and the chemical is worked into the soil to a depth of 6 inches. Sugar beets grown in this field are substantially free from nematode infestation.

Propylene sulfite substituted for ethylene sulfite in this formulation also protects the beets from such nematode infestation.

Example 7

| | Percent |
|---|---|
| Ethylene sulfite | 10 |
| Tetramethyl thiuram disulfide | 10 |
| Talc | 40 |
| Montmorillonoid clay | 40 |

These ingredients are thoroughly blended in a ribbon blender. This blend is then ground in a hammer mill until the particle size is substantially less than 50 microns in diameter.

This dust is useful as a hopper box treatment for seeds such as cotton. For application one pound of this dust is mixed with a hundred weight of machine-delinted cotton seed for hopper box application at planting time. After planting, the protected seeds germinate and the cotton seedlings and growing plants are protected from soil fungi such as Rhizoctonia spp. A healthy stand of cotton plants and an excellent yield of cotton is produced per acre. Where seed is not treated as above, the young plants frequently fail to survive, resulting in a poor crop of cotton.

Propylene sulfite when substituted for the ethylene sulfite of this formulation exhibits similar seed protectant activity.

Example 8

The wettable powder of Example 3 is diluted with micaceous talc to obtain a dust containing 2.5% active ingredient:

| | Percent |
|---|---|
| Powder of Example 3 | 10 |
| Micaceous talc | 90 |

The ingredients are thoroughly blended and deagglomerated until a uniform product is obtained. The mixture is applied to the soil at the rate of 90 pounds of active ingredient per acre, and is disked or rototilled into the soil to obtain mixing into the zone of nematode infestation.

Example 9

The emulsifiable formulation of Example 4 is diluted with water to give an aqueous system containing about 60 p.p.m. of the active ingredient. Narcissus bulbs infested with the bulb and stem nematode *Ditylenchus dipsaci* are dipped in this diluted preparation for a period of 10 to 30 minutes. The treated bulbs planted in field soil grow to produce good yields of both cut flowers and new bulbs. Similarly infected bulbs that are not treated grow poorly giving only small yields of both flowers and bulbs.

Example 10

The wettable powder of Example 3 is mixed with water and sprayed onto a tobacco seed bed and field soil at the rate of 90 pounds of active ingredient per acre. It is then rotovated immediately into the soil infested with soil fungi, including *Rhizoctonia solani* and nematodes including Pratylenchus spp., Meloidogyne spp., and *Tylenchorhynchus claytoni*. All of the aforementioned organisms cause severe damage to tobacco seedlings. Tobacco seed planted in this treated area germinate and a healthy stand of tobacco seedlings result. Seed planted in untreated soil frequently are killed by the fungi. Those that survive and germinate are later attacked by the nematodes resulting in seedlings which cannot be used for transplanting in the field.

Example 11

| | Percent |
|---|---|
| Propylene sulfite | 15.0 |
| Sodium alkyl naphthalene sulfonate | 2.0 |
| Partially desulfonated sodium lignin sulfonate | 0.5 |
| Kaolin clay | 82.5 |

These materials are thoroughly blended in a ribbon blender, and ground in a micropulverizer until the particle size is substantially less than 50 microns. The resulting wettable powder formulation can be diluted with water to any desired spray concentration.

This formulation is suspended in water, and drenched about the roots of boxwood plants infected with the meadow nematodes Pratylenchus spp. at a rate of about 90 pounds active agent per acre, using enough water to wash the active agent down about the plant roots. Substantially all spiral nematodes are killed by this treatment, allowing the boxwood plant to develop in a normal manner.

When ethylene sulfite is substituted for the propylene sulfite in this formulation similar control of the spiral nematode is obtained.

The invention claimed is:

1. A method of protecting growing plants from nematodes and fungi comprising applying to the nematodes and fungi a plant protectant amount of a compound selected from the group consisting of ethylene sulfite and propylene sulfite.

2. A method of protecting plants from nematodes comprising applying to the nematodes a plant protectant amount of ethylene sulfite.

3. A method of protecting plants from fungi comprising applying to the fungi a plant protectant amount of ethylene sulfite.

4. A method of protecting plants from nematodes comprising applying to the nematodes a plant protectant amount of propylene sulfite.

5. A method of protecting plants from fungi comprising applying to the fungi a plant protectant amount of propylene sulfite.

6. A method of controlling fungi and nematodes comprising applying to the fungi and nematodes a controlling amount of a compound selected from the group consisting of ethylene sulfite and propylene sulfite.

7. A method of claim 6 in which the compound applied is ethylene sulfite.

8. A method of claim 6 in which the compound applied is propylene sulfite.

9. A method of protecting growing plants from nematodes and fungi comprising applying to nematode and fungus infested soil in which the plant is growing a plant protectant amount of a compound selected from the group consisting of ethylene sulfite and propylene sulfite.

10. The method of claim 9 in which the compound applied is ethylene sulfite.

11. The method of claim 9 in which the compound applied is propylene sulfite.

(References on following page)

References Cited

UNITED STATES PATENTS

| | | | |
|---|---|---|---|
| 2,413,405 | 12/1946 | Campbell | 167—39 |
| 2,465,915 | 3/1949 | Myles et al. | 260—327 |
| 2,706,674 | 4/1955 | Rothrock | 260—327 |

FOREIGN PATENTS

| | | |
|---|---|---|
| 346,685 | 4/1931 | Great Britain. |
| 898,630 | 6/1962 | Great Britain. |

OTHER REFERENCES

Frear: Chemistry of the Pesticides, D. Van Nostrand Co., New York (1955), pp. 409–419.

Chemical Abstracts, volume 57: 9978i (1962).

Insects, The Yearbook of Agriculture, U.S. Dept. of Agriculture, Washington, D.C. (1962), pp. 21-24.

ALBERT T. MEYERS, *Primary Examiner*.

V. C. CLARKE, *Assistant Examiner*.